United States Patent
Mermagen et al.

[11] Patent Number: 5,990,551
[45] Date of Patent: *Nov. 23, 1999

[54] BONDING OF SILICON CARBIDE CHIP WITH A SEMICONDUCTOR

[75] Inventors: Timothy Mermagen, Havrede Grace, Md.; Judith McCullen, Buffalo Mills, Pa.; Robert Reams, Silver Spring; Bohdan Dobriansky, Bethesda, both of Md.

[73] Assignee: The United States of America as represented by the Secretary of the Army, Washington, D.C.

[*] Notice: This patent is subject to a terminal disclaimer.

[21] Appl. No.: 09/049,656

[22] Filed: Mar. 23, 1998

[51] Int. Cl.$^6$ .................................................. H01L 31/0312
[52] U.S. Cl. ............................ 257/713; 257/712; 257/76; 257/77
[58] Field of Search .................................... 257/713, 712, 257/76, 77

[56] References Cited

U.S. PATENT DOCUMENTS

| | | | |
|---|---|---|---|
| 4,642,864 | 2/1987 | Metcalfe et al. | 29/157.3 R |
| 5,008,735 | 4/1991 | Edmond et al. | 357/74 |
| 5,759,908 | 6/1998 | Steckl et al. | 438/479 |
| 5,801,442 | 9/1998 | Hamilton et al. | 257/714 |
| 5,877,516 | 3/1999 | Mermagen et al. | 257/76 |
| 5,933,750 | 8/1999 | Wilson et al. | 438/455 |

*Primary Examiner*—Brian Dutton
*Assistant Examiner*—Hung Van Duong
*Attorney, Agent, or Firm*—Paul S. Clohan

[57] ABSTRACT

A module and a method of making the module is disclosed. The module is formed from a semiconductor and a silicon carbide chip for high temperature applications. The module is designed to be compatible with current silicon IC processes.

4 Claims, 1 Drawing Sheet

BONDING OF SILICON CARBIDE CHIP WITH A SEMICONDUCTOR

FIELD OF THE INVENTION

This invention pertains to bonding ceramic parts onto silicon substrates for high temperature use. The high temperature process is designed to be compatible with current silicon IC processes. This bonding method and the resultant module have pertinent application in sensing or control circuitry, particularly for development of tank engines, rocket engines and reentry vehicles.

BACKGROUND OF THE INVENTION

High temperature circuits are becoming a reality with the advent of silicon carbide substrate. Recent developments include a circuit that can withstand temperatures of up to 300° C. for short periods of time. These circuits generally comprise silicon carbide transistors, resistive and capacitive elements and metallic interconnects mounted on an aluminum oxide substrate (ceramic). While ceramics can withstand high temperature, the material used to bond the discrete device to the substrate can not. Subjected to these high temperatures, the bonding material melts, breaks down, or degrades. Alternate bonding mediums can be cumbersome to use and do not have high temperature properties.

Currently, bonding silicon carbide to a substrate is conducted in a bond and etch back technique for fusing two silicon waters together, leaving a silicon dioxide layer in between. While this process produces a carbide/substrate module, these cannot hold up to the high temperature applications as our instant invention.

U.S. Pat. No. 5,098,494 to Arnold Reisman discloses a process for bonding first and second ceramic parts which may be bonded by forming bonding layers of silicon dioxide, silicon, metal or metal oxide on the parts, placing the bonding adjacent layers next to each other and heating in an oxidizing atmosphere to form an oxide bond therebetween. A layer of silicon dioxide may be formed on the first and second ceramic parts prior to bonding first and second ceramic parts. Reisman's bonding technique is used for bonding two ceramic parts at temperature lower than their melting points.

U.S. Pat. No. 4,352,120 to Kurihara et al. discloses a method of bonding silicon carbide to silicon carbide by forming silicon dioxide on at least one of the surfaces to be bonded. A conductive layer, for example copper, is then evaporated on one silicon dioxide surface and the two surfaces are solder-bonded together.

SUMMARY OF THE INVENTION

It is an object of the present invention to provide a process for bonding or attaching together a ceramic part to a semiconductor substrate that is capable of withstanding high temperatures in its working environment.

It is also an object of the present invention to provide a bonded module or structure of ceramic and semiconductor substrate that is capable of withstanding high temperatures in its working environment.

It is yet another object of the present invention to provide a method and structure for bonding or attaching a semiconductive substrate to a silicon carbide chip which employs known bonding processes that were heretobefore not used for bonding a semiconductor substrate to silicon carbide chips.

DETAILED DESCRIPTION OF THE PREFERRED EMBODIMENTS

Figure 1:
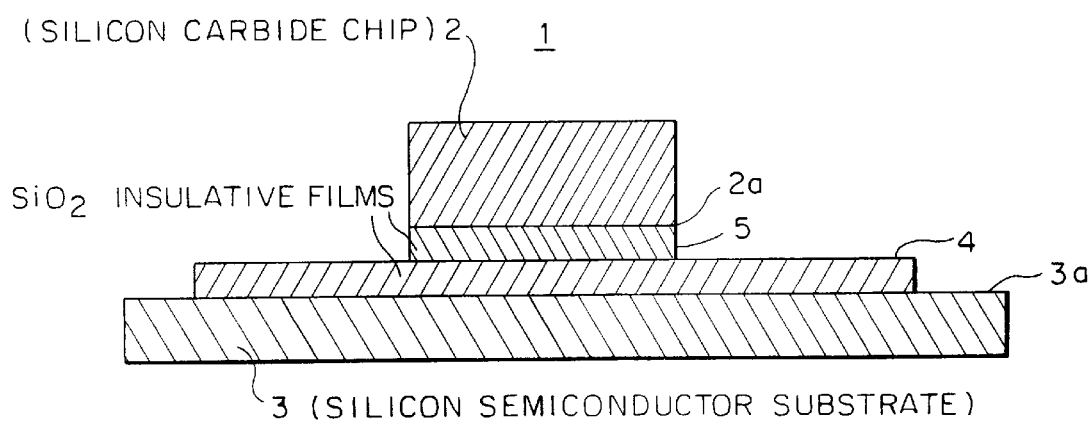
FIG. 1 illustrates the invention prior to bonding.

The invention is directed to a high temperature process for bonding together a ceramic part to a semiconductor substrate which is compatible with current silicon IC processes. The process is more selectively fabricated with silicon carbide circuits on semiconductor substrates and produces a module capable of withstanding temperatures of 600° C. and above, in its functioning environment.

Referring to FIG. 1, module 1 of the instant invention, is fabricated from carbide chip 2 and semiconductor substrate 3. A first insulator film 4 is grown or deposited on a top surface 3a of substrate 3. A second insulator film 5 is grown or deposited on a bottom surface 2a of carbide chip 2. First film 4 is positioned in contact with second film 5 and brought to a temperature suitable to bond films 4 and 5 together thereby bonding semiconductors substrate 3 to carbide chip 2 thus forming module 1. Uniquely, module 1 experiences stronger bonding between films 4 and 5, when exposed to the high temperatures prevalent in its working environment. Thisnovel method is useful for producing multi-chip modules or wafer scale integrated circuits for high temperature applications.

The method of producing module 1 includes the steps of (a)depositing first insulating film 4 on top surface 3a of semiconductor substrate 3; (b) depositing second insulating film 5 on bottom surface 2a of carbide chip 2; (c) contacting first insulating film 4 with second insulating film 5, and (d) bonding first insulating film 4 of semiconductor substrate 3 to second insulating film 5 of carbide chip 2 thereby forming module 1.

Carbide chip or chips 2 are bonded or attached to the semiconductive substrate as mentioned above and connected to the circuit with conductive interconnects (not shown).

According to the invention, carbide chips 2 may be made of silicon carbide, substrate 3 may be of the <100> orientation 1.3 Ω-cm resistivity n-type silicon wafers or glass. Insulator films 4 and 5 may be of silicon dioxide.

What is claimed is:

1. A module comprising:

(a) a semiconductor substrate having a top surface;

(b) a first insulating film positioned on said top surface of said semiconductor substrate;

(c) a carbide chip having a bottom surface;

(d) a second insulating film positioned on said bottom surface of said carbide chip;

said first insulating film and said second insulating film further positioned so as to contact one another; said substrate and said chip thereby forming said module.

2. The module as recited in claim 1 wherein said semiconductor substrate is selected from the group consisting of glass and <100> orientation 1.3 ohm-cm n-type silicon wafer.

3. The module as recited in claim 1 wherein said carbide chip comprises silicon carbide.

4. The module as recited in claim 1 wherein said first and second insulating films comprise silicon dioxide.

* * * * *